(12) United States Patent
Wickramanayake

(10) Patent No.: US 7,666,256 B2
(45) Date of Patent: *Feb. 23, 2010

(54) AMPHOTERIC PIGMENT DISPERSION CONTAINING INK FORMULATIONS, METHODS OF USING INK FORMULATIONS, AND SYSTEMS USING INK FORMULATIONS

(75) Inventor: Palitha Wickramanayake, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/975,705

(22) Filed: Oct. 28, 2004

(65) Prior Publication Data

US 2006/0092250 A1 May 4, 2006

(51) Int. Cl.
*C09D 11/02* (2006.01)
(52) U.S. Cl. ..................................................... 106/31.6
(58) Field of Classification Search ................ 106/31.6
See application file for complete search history.

(56) References Cited

U.S. PATENT DOCUMENTS

| | | | | | |
|---|---|---|---|---|---|
| 5,514,207 | A | * | 5/1996 | Fague | 106/31.86 |
| 5,624,484 | A | * | 4/1997 | Takahashi et al. | 106/31.75 |
| 5,734,403 | A | * | 3/1998 | Suga et al. | 347/101 |
| 5,911,815 | A | * | 6/1999 | Yamamoto et al. | 106/31.27 |
| 6,022,908 | A | * | 2/2000 | Ma et al. | 523/160 |
| 6,247,808 | B1 | * | 6/2001 | Ma et al. | 347/100 |
| 6,309,452 | B1 | * | 10/2001 | Beach et al. | 106/31.27 |
| 6,454,403 | B1 | * | 9/2002 | Takada et al. | 347/100 |
| 6,652,084 | B1 | * | 11/2003 | Teraoka et al. | 347/100 |
| 6,723,783 | B2 | | 4/2004 | Palumbo et al. | |
| 2004/0173120 | A1 | * | 9/2004 | Tsuru et al. | 106/31.13 |
| 2004/0261658 | A1 | * | 12/2004 | Rehman | 106/31.43 |
| 2005/0054751 | A1 | * | 3/2005 | Namba et al. | 523/160 |
| 2006/0092252 | A1 | * | 5/2006 | Wickramanayake | 347/100 |

FOREIGN PATENT DOCUMENTS

| | | |
|---|---|---|
| EP | 0 559 324 A | 9/1993 |
| EP | 0 924 272 A | 6/1999 |
| EP | 1 088 863 A | 4/2001 |
| EP | 1 491 594 A | 12/2004 |
| JP | 61-183362 A | 8/1986 |
| JP | 04-139272 A | 5/1992 |
| JP | 07-041720 A | 2/1995 |
| JP | 09-143414 A | 6/1997 |
| JP | 10-060352 A | 3/1998 |
| JP | 2003-313471 | 4/2002 |
| JP | 2002-265833 | 9/2002 |
| JP | 2004-149666 | 10/2002 |
| JP | 2002-338860 | 11/2002 |
| JP | 2003-003093 A | 1/2003 |
| JP | 2004-115549 | 4/2004 |

* cited by examiner

*Primary Examiner*—Jerry Lorengo
*Assistant Examiner*—Veronica Faison Gee

(57) ABSTRACT

Ink-jet ink sets, pigment-based ink formulations, methods of printing, and methods of enhancing print quality, are disclosed. One exemplary ink-jet ink set, among others, includes a pigment-based ink formulation at a first pH, including: a pigment, and an amphoteric dispersant having an isoelectric point; and a second ink formulation at a second pH, wherein the first pH and the second pH are each selected from an acidic pH and a basic pH, wherein the first pH and the second pH are not the same, and wherein the amphoteric dispersant has a higher isoelectric point than the first pH when the dispersant is acidic, and a lower isoelectric point than the first pH when the dispersant is basic.

10 Claims, 1 Drawing Sheet

AMPHOTERIC PIGMENT DISPERSION CONTAINING INK FORMULATIONS, METHODS OF USING INK FORMULATIONS, AND SYSTEMS USING INK FORMULATIONS

BACKGROUND

The use of inkjet printing systems in offices and homes has grown dramatically in recent years. The growth can be attributed to drastic reductions in cost of inkjet printers and substantial improvements in print resolution and overall print quality. While the print quality has drastically improved, research and development efforts continue toward improving the permanence of inkjet images because this property still falls short of the permanence produced by other printing and photographic techniques. A continued demand in inkjet printing has resulted in the need to produce images of high quality, high permanence, and high durability, while maintaining a reasonable cost.

In inkjet printing, the inkjet image is formed on a print medium when a precise pattern of dots is ejected from a drop-generating device known as the printhead. The typical inkjet printhead has an array of precisely formed nozzles located on a nozzle plate and attached to an inkjet printhead array. The nozzles are typically 30 to 40 micrometers in diameter. The inkjet printhead array incorporates an array of firing chambers that receive liquid ink, which includes pigments and/or dyes dissolved and/or dispersed in a liquid vehicle, through fluid communication with one or more ink reservoirs. Each chamber has a thin-film resistor, known as a firing resistor, located opposite the nozzle so that the ink can collect between the firing resistor and the nozzle. Upon energizing of a particular firing resistor, a droplet of ink is expelled through the nozzle toward the print medium to produce the image. The printhead is held and protected by an outer packaging referred to as a print cartridge or an inkjet pen.

When inks of different colors are printed next to each other on bond paper, copier paper, and other media, bleeding could result. Bleeding occurs as colors mix both on the surface of the paper being printed on and in the paper. The term "bleed" is defined as follows. When inks of two different colors are printed next to each other, it is desired that the border between the two colors be clean and free from the invasion of one color into the other. When one color does invade into the other, the border between the two colors becomes ragged, and this is called bleed. This is in contradistinction to uses of the term "bleed" in other situations, which often defines "bleed" in the context of ink of a single color following the fibers of the paper.

Prior solutions to control bleed have largely involved the use of heated platens or other heat sources and/or special paper. Heated platens add cost to the printer. Special paper limits the user to a single type of paper, which may be of a higher cost than a plain paper. Another way to reduce bleed involves increasing the penetration rate of the ink into the paper. However, increasing the penetration rate reduces the edge acuity (lowers the print quality of the print). Therefore, alternate bleed control mechanisms are needed.

SUMMARY

Briefly described, embodiments of this disclosure include ink-jet ink sets, pigment-based ink formulations, methods of printing, and methods of enhancing print quality. One exemplary ink-jet ink set, among others, includes a pigment-based ink formulation at a first pH, including: a pigment, and an amphoteric dispersant having an isoelectric point; and a second ink formulation at a second pH, wherein the first pH and the second pH are each selected from an acidic pH and a basic pH, wherein the first pH and the second pH are not the same, and wherein the amphoteric dispersant has a higher isoelectric point than the first pH when the dispersant is acidic, and a lower isoelectric point than the first pH when the dispersant is basic.

An exemplary pigment-based ink formulation, among others, includes pigment-based ink formulation, comprising: a pigment-based ink having a first pH; and an amphoteric dispersant, wherein the amphoteric dispersant is charged, and wherein the amphoteric dispersant is selected from compounds containing protonizable groups and ionizable acid groups, wherein the amphoteric dispersant has an isoelectric point, and wherein the amphoteric dispersant has a higher isoelectric point than the first pH when the dispersant is acidic, and a lower isoelectric point than the first pH when the dispersant is basic.

One exemplary method of printing, among others, includes providing a dispensing system including a first pigment-based ink formulation at a first pH and a second ink formulation at a second pH, wherein the first pigment-based ink formulation includes a first pigment and an amphoteric dispersant, wherein the amphoteric dispersant has an isoelectric point, wherein the first pH and the second pH are each selected from an acidic pH from about 3 to 6.5 and a basic pH from about 7.5 to 10, wherein the amphoteric dispersant has a higher isoelectric point than the first pH when the dispersant is acidic, and a lower isoelectric point than the first pH when the dispersant is basic; and dispensing the first pigment-based ink formulation and the second ink formulation, wherein if the first pigment-based ink formulation and the second ink formulation are dispensed adjacent one another, an ink bleed between the first pigment-based ink formulation and the second ink formulation is substantially arrested.

One exemplary method of enhancing print quality, among others, includes providing a first pigment-based ink formulation at a first pH and a second ink formulation at a second pH, wherein the first pigment-based ink formulation includes a first pigment- and an amphoteric dispersant, wherein the first pH and the second pH are each selected from an acidic pH and a basic pH, wherein the first pH and the second pH are not the same, and wherein an isoelectric point of the amphoteric dispersant is between the first pH and the second pH; and reducing bleed between the first pigment-based ink formulation and the second ink formulation by disposing the first pigment-based ink formulation and the second ink formulation adjacent one another.

BRIEF DESCRIPTION OF THE DRAWING

Many aspects of this disclosure can be better understood with reference to the following drawing. The components in the drawing are not necessarily to scale.

DETAILED DESCRIPTION

Figure 1:
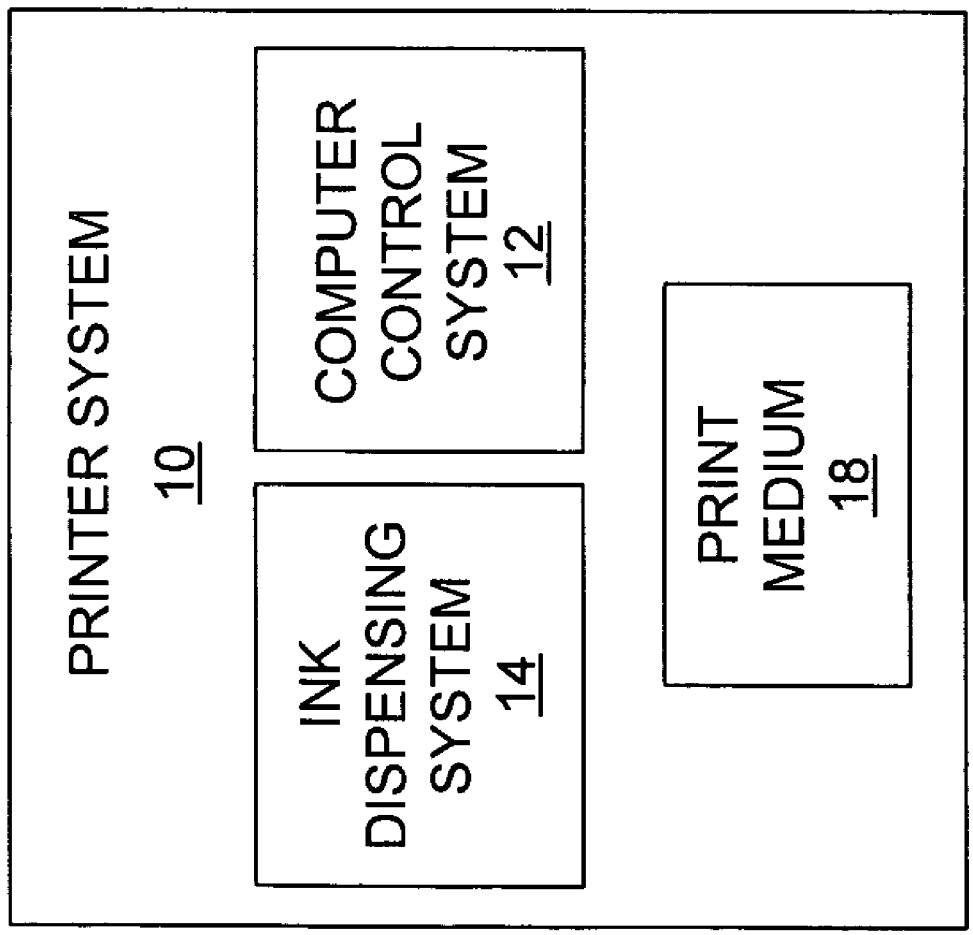
FIG. 1 illustrates an embodiment of a printer system.

Pigment-based ink formulations, ink-jet ink sets, methods of printing, and printer systems are described. Embodiments of the present disclosure enable a pigment-based ink formulation and another ink formulation to be dispensed adjacent one another, while controlling bleeding (e.g., bleed arrest between pigment-based ink and the other ink) between the pigment-based ink and another ink.

In general, the pigment-based ink formulation includes, but is not limited to, a pigment-based ink in which the pigment is dispersed with an amphoteric dispersant. The pigment-based ink formulation is at a pH opposite to that of the other ink formulation (e.g., one is acidic (net positive charge on the dispersant) and the other is basic (negative charge)). Therefore, once the two formulations are disposed adjacent one another, at the boundary the amphoteric dispersant is attracted (opposites charges attract) to the colorant of the other ink formulation, and in the process the amphoteric dispersant either reaches, or approaches its isoelectric point. As the isoelectric point is approached (e.g., about one pH unit prior to the isoelectric point) the pigment dispersed with the amphoteric dispersant becomes unstable and falls out of solution (i.e., "crashes out"). When the pigment crashes out, it is not as mobile as had it been when dispersed, thus, resulting in bleed arrest. Hence, this bleed arrest mechanism is an addition to the bleed arrest due to the interaction of the two oppositely charged colorants coming together and crashing out of solution, thus providing a robust bleed arrest.

In addition, high optical densities can be achieved when using pigment-based ink formulation having the amphoteric dispersants relative to formulations that do not use amphoteric dispersants. As a result, the amphoteric dispersant dispersed pigment-based ink formulation can include a relatively lower amount of pigment than "conventional" dispersant pigment ink formulations.

FIG. 1 illustrates a block diagram of a printer system 10 that can use the pigment-based ink formulation. The printer system 10 includes a computer control system 12, an ink dispensing system 14, and a print medium 18. The computer control system 12 includes a process control system that is operative to control the ink dispensing system 14. In particular, the computer control system 12 instructs and controls the ink dispensing system 14 to print characters, symbols, photos, etc. onto the print medium 18 using the pigment-based ink formulation and other ink formulations.

The ink dispensing system 14 includes, but is not limited to, conventional ink-jet technologies, which dispense one or more inks (e.g., the pigment-based ink formulation) onto the print medium. Ink-jet technology, such as drop-on-demand and continuous flow ink-jet technologies, can be used to dispense the ink. The ink dispensing system 14 can include at least one conventional ink-jet printhead system (e.g., thermal ink-jet printhead and/or a piezo ink-jet print head) operative to dispense (e.g., jet) the inks through one or more of a plurality of nozzles in a printhead. The printhead system incorporates an array of firing chambers that receive the ink dissolved or dispersed in a liquid vehicle, which are in fluid communication with one or more ink reservoirs.

The terms "print media" and "print medium" can include, but are not limited to, a paper substrate, a photobase substrate, a plastic media (e.g., clear to opaque plastic film) substrate, and the like. The print media may include, but is not limited to, a hard or flexible material made from a polymer, a paper, a glass, a ceramic, a woven cloth, or a non-woven cloth material.

As mentioned above, the pigment-based ink formulation includes, but is not limited to, a pigment-based ink containing a pigment dispersed with an amphoteric dispersant. In another embodiment, the pigment-based ink formulation includes a vehicle compatible with the pigment dispersed with an amphoteric dispersant. In other pigment-based ink formulations the formulation can include, but is not limited to, a solvent, a salt, a buffer, a biocide, a surfactant, and combinations thereof.

The pigment-based ink formulation can be used in an ink-jet ink set having one or more ink formulations. For example, the ink set can include the pigment-based ink formulation and a second ink formulation. In other embodiments, the ink set can include the pigment-based ink formulation and a plurality of ink formulations. For clarity, in this disclosure the ink set will be discussed in reference to the second ink formulation, but one skilled in the art will understand that the pigment-based ink formulation can be used in conjunction with one or more ink formulations (e.g., pigment-based inks and/or dye-based inks of one or more colors) and achieve similar bleed arrest and optical density results.

The pigment-based ink formulation has a first pH, at which the dispersant is maintained in either cationic or anionic form. The second ink is maintained at a second pH, which maintains its colorant in an oppositely charged state. The first pH is either acidic at a pH of about 3 to 6.5, and about 4 to 6, or alkaline at a pH of about 7.5 to 10, and about 7.5 to 9. Further, the amphoteric dispersant has an isoelectric point higher than the first pH when the dispersant is acidic, and lower than the first pH when the dispersant is alkaline. The term isoelectric point is defined to be the pH value at which the amphoteric dispersant has a net neutral charge.

The pigment of the pigment-based ink formulation can include, but is not limited to, black pigments and colored pigments. Colored pigments can include, but are not limited to, blue, brown, cyan, green, white, violet, magenta, red, orange, yellow, as well as mixtures thereof. Representative examples of colored pigments are described below in reference to the second ink formulation below.

Black self-dispersed pigments and methods of attaching functionalized groups are described in See U.S. Pat. Nos. 5,707,432; 5,630,868; 5,571,311; 5,554,739, and 6,723,783, all of which are incorporated herein by reference. For example, the black pigment can include, but is not limited to, pigments from Cabot: Monarch® 1400, Monarch® 1300, Monarch® 1100, Monarch® 1000, Monarch® 900, Monarch® 880, Monarch® 800, and Monarch® 700. The pigment-based ink can include an amount of pigment from about 0.5 to 5 weight percent of the pigment-based ink formulation, from about 1.5 to 4.0 weight percent of the pigment-based ink formulation, and from about 2.0 to 3.5 weight percent of the pigment-based ink formulation.

In general, amphoteric dispersants include compounds such as, but not limited to, compounds containing protonizable groups and ionizable acid groups. The appropriate selection of the groups and the ratio of groups can be selected to obtain desired properties of the dispersant. The isoelectric point is a characteristic of the dispersant, and is determined by the groups and the ratio of protonizable and the ionizable acid groups on the dispersant. Amino acids are one exemplar class of compounds that can be used as dispersants. In particular, one example would be the reaction of succinic anhydride with polyethyleneimine. In addition, a protonizable group(s) containing compound and an ionizable acid group(s) containing compound may be separately used in appropriate proportions to disperse a pigment.

The amphoteric dispersant is present in an amount from about 0.01 to 8 weight percent of the pigment-based ink formulation, from about 1 to 5 weight percent of the pigment-based ink formulation, and from about 2 to 4 weight percent of the pigment-based ink formulation.

In an embodiment, the pigment-based ink formulation includes a vehicle. The vehicle is compatible with the amphoteric dispersant and at least a minimum amount required in order to solubilize or disperse components of the pigment-based ink formulation is used, while providing good ink-jettability properties, thereby meeting desired functional performance and characteristics. The vehicle can include compounds such as, but not limited to, water, organic solvents, and combinations thereof.

For example, the organic solvent can include, but is not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly (ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides.

In particular, the solvent can include, but is not limited to ethoxylated glycerol; 2-methyl-1,3-propanediol; 2-methyl 2,4-pentanediol; 1,5-pentanediol; 2-pyrrolidone; 1-(2-hydroxyethyl)-2-pyrrolidinone; 2-ethyl-2-hydroxymethyl-1,3-propanediol; diethylene glycol; 3-methoxybutanol; and 1,3-dimethyl-2-imidazolidinone. The solvent can also include, but is not limited to, 1,2-hexanediol; 1,2-octanediol; 2,5-dimethyl-3-hexyne-2,5 diol; trimethylol propane,3-hexnye-2,5-diol; sulfolane,3-pyridyl carbinol; and other pyridine derivatives. In addition, the solvents can be added to reduce the rate of evaporation of water in the ink-jet to minimize clogging or other properties of the ink such as viscosity, pH, surface tension, optical density, and print quality.

Various biocides can be used to inhibit growth of undesirable microorganisms. The biocides can include, but are not limited to, benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas), and other biocides.

The non-ionic surfactant can include, but is not limited to, alkylphenol ethoxylates, polyoxyethylenates, straight chain alcohols ethoxylates, polyoxyethylenated polyoxypropylene glycols, polyoxyethylenated mercaptans, long chain carboxylic acid esters, glyceryl and polyglyceryl esters of natural and fatty acids, propylene glycol, sorbitol and polyoxyethylenated sorbitol esters, polyoxyethylene glycol esters and polyoxyethylenated fatty acids, alkanolamine condensates, alkanolamides, tertiary acetylenic glycols, polyoxyethylenated silicones, N-alkylprrolidones, and alkylpolyglycosides.

All ionic ingredients of the vehicle such as surfactants, biocides, buffers, and other additives are selected so they carry like charges to that of the colorant in the pH range selected. Otherwise, undesired interactions resulting in unstable inks could result.

The second ink formulation can include, but is not limited to, dye-based inks and pigment-based inks. The dye-based inks and pigment-based inks may be cationic or anionic. In general, dye-based inks and pigment-based inks for use in ink-jet printing can be employed in the practice of this disclosure. The color inks can include a large number of water-soluble acid and direct dyes. For the purposes of clarification only, and not for limitation, some exemplary colorants suitable for this purpose are set forth below. The color of the second ink formulation can include, but is not limited to, blue, black, brown, cyan, green, white, violet, magenta, red, orange, yellow, as well as mixtures thereof.

The pigments can include, but are not limited to, pigments from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140; pigments from Ciba-Geigy: Chromophtal® Yellow 3G, Chromophtal® Yellow GR, Chromophtal® Yellow 8G, Irgrazin® Yellow 5GT, Irgralite® Rubine 4BL, Monastral® Magenta, Monastral® Scarlet, Monastral® Violet R, Monastral® Red B, and Monastral® Violet Maroon B; pigments from Degussa: Printex U, Printex V, Printex 140U, and Printex 140V; pigments from DuPont: Tipure® R-101; pigments from Heubach: Dalamar® Yellow YT-858-D and Heucophthal® Blue G XBT-583D; pigments from Hoechst: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm.RTM. Yellow H4G, Hostaperm® Yellow H3G, Hostaperm® Orange GR, Hostaperm® Scarlet GO, and Permanent Rubine F6B; pigments from Mobay: Quindo® Magenta, Indofast® Brilliant Scarlet, Quindo® Red R6700, Quindo® Red R6713, and Indofast® Violet; and pigments from Sun Chem: L74-1357 Yellow, L75-1331 Yellow, and L75-2577 Yellow.

The aqueous color dyes can include, but are not limited to, sulfonate and carboxylate dyes, specifically, those that are commonly employed in ink-jet printing. Specific examples include: Sulforhodamine B (sulfonate), Acid Blue 113 (sulfonate), Acid Blue 29 (sulfonate), Acid Red 4 (sulfonate), Rose Bengal (carboxylate), Acid Yellow 17 (sulfonate), Acid Yellow 29 (sulfonate), Acid Yellow 42 (sulfonate), Acridine Yellow G (sulfonate), Nitro Blue Tetrazolium Chloride Monohydrate or Nitro BT, Rhodamine 6G, Rhodamine 123, Rhodamine B, Rhodamine B Isocyanate, Safranine O, Azure B, Azure B Eosinate, Basic Blue 47, Basic Blue 66, Thioflacin T (Basic Yellow 1), and Auramine 0 (Basic Yellow 2), all available from Aldrich Chemical Company.

The solvent can include, but is not limited to, water soluble organic solvents. The water soluble organic solvents can include, but are not limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones.

For example, the solvent can include, but is not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides.

In particular, the solvent can include, but is not limited to, ethoxylated glycerol; 2-methyl-1,3-propanediol; 2-methyl 2,4-pentanediol; 1,5-pentanediol; 2-pyrrolidone; 1-(2-hydroxyethyl)-2-pyrrolidinone; 2-ethyl-2-hydroxymethyl-1,3-propanediol; diethylene glycol; 3-methoxybutanol; and 1,3-dimethyl-2-imidazolidinone. The solvent can also include, but is not limited to, 1,2-hexanediol; 1,2-octanediol; 2,5-dimethyl-3-hexyne-2,5 diol; trimethylol propane,3-hexnye-2,5-diol; sulfolane,3-pyridyl carbinol; and other pyridine derivatives. In addition, the solvents can be added to reduce the rate of evaporation of water in the ink-jet to minimize clogging or other properties of the ink such as viscosity, pH, surface tension, optical density, and print quality.

Various biocides can be used to inhibit growth of undesirable microorganisms. The biocides can include, but are not limited to, benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas), and other biocides.

The non-ionic surfactant can include, but is not limited to, alkylphenol ethoxylates, polyoxyethylenates, straight chain alcohols ethoxylates, polyoxyethylenated polyoxypropylene glycols, polyoxyethylenated mercaptans, long chain carboxylic acid esters, glyceryl and polyglyceryl esters of natural and fatty acids, propylene glycol, sorbitol and polyoxyethylenated sorbitol esters, polyoxyethylene glycol esters and polyoxyethylenated fatty acids, alkanolamine condensates, alkanolamides, tertiary acetylenic glycols, polyoxyethylenated silicones, N-alkylprrolidones, and alkylpolyglycosides.

It should be noted that the ionic ingredients of the vehicle such as surfactants, biocides, buffers, and other additives, are selected so that they carry like charges to that of the colorant in the pH range selected. Otherwise, undesired interactions resulting in unstable inks could result.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range.

EXAMPLES

The following are non-limiting illustrative examples of an embodiment of the present disclosure. These examples are not intended to limit the scope of any embodiments of the present disclosure. Therefore, one skilled in the art would understand that the exact formulations can be modified, but it is intended that these modifications be within the scope of the embodiments of the present disclosure.

Example 1

Monarch 700 (Cabot) was modified by the reaction with APSES, followed by PEI 1800, followed by phenylsuccinic anhydride, according to U.S. Pat. No. 6,723,783, which is incorporated herein by reference. The pigment was taken at a concentration of 3.5% in a vehicle having about 4% ethoxylated glycerol (Liponics), about 8% hydroxymethylpropanediol, about 10% 2-pyrolidonone, about 1% propylene glycol n-butyl ether, about 0.1% nonionic surfactant, and the balance being water. The ink pH was maintained at about 4, thus obtaining a cationic ink.

The color ink can be either pigment-based or dye based, and the pH was maintained alkaline around a pH of about 8.5; thus the colorant, if a dye, was anionic. If the colorant was a pigment, it was anionically dispersed. Excellent black to color bleed was obtained. Furthermore, when the black pigment was simply cationic, as opposed to amphoteric, that is when Monarch 700 was modified with APSES, followed by PEI and taken in the same vehicle printed against the same colors, the black to color bleed performance was not as robust as in the case of the amphoteric counterpart described in this example. Plain paper black optical density average on a selected "paper set" exceeded about 1.4. The optical density of DJ5550 on the same paper set was about 1.2.

Example 2

Monarch 700 (Cabot) was modified by the reaction with APSES, followed by reaction with a mixture of PEI 600 and Arginine according to U.S. Pat. No. 6,723,783. The black ink was taken in the same vehicle as example 1, and maintained cationic by adjusting the pH to about 4. Printed against the same colors in example 1, once again excellent black to color bleed performance was obtained. Optical density average on the same plain paper set as in example 1 exceeded about 1.4.

Many variations and modifications may be made to the above-described embodiments. All such modifications and variations are intended to be included herein within the scope of this disclosure and protected by the following claims.

At least the following is claimed:

1. An ink-jet ink set, comprising:
   a first pigment-based ink formulation at an acidic pH, including:
   a pigment, and
   an amphoteric dispersant having an isoelectric point, wherein the amphoteric dispersant is formed by the reaction of a succinic anhydride with polyethyleneimine; and
   a second ink formulation at a basic pH,
   wherein the amphoteric dispersant has an isoelectric point higher than the acidic pH, and the isoelectric point is between the acidic pH and the basic pH,
   wherein when the first pigment-based ink formulation and the second ink formulation are disposed adjacent one another, the dispersed pigment falls out of solution, resulting in reduced bleed between the first pigment-based ink formulation and the second ink formulation.

2. The ink-jet ink set of claim 1, wherein the amphoteric dispersant is in an amount from about 0.01 to 8 weight percent of the pigment-based ink formulation.

3. The ink-jet ink set of claim 1, further comprising a vehicle selected from water, organic solvents, and combinations thereof.

4. The ink-jet ink set of claim 3, wherein the acidic pH is from about 3 to 6.5, and the second pH is a basic pH.

5. The ink-jet ink set of claim 1, wherein the pigment is in an amount from about 0.5 to 5 weight percent of the pigment-based ink formulation.

6. The ink-jet ink set of claim 1, wherein the pigment is a self-dispersed black pigment.

7. The ink-jet ink set of claim 1, wherein the second ink formulation includes an ink selected from a pigment-based ink, a dye-based ink, and combinations thereof.

8. The ink-jet ink set of claim 1, wherein the acidic pH is from about 3 to 6.5, and wherein the basic pH from 7.5 to 10.

9. A method of printing, comprising:
   dispensing a first pigment-based ink formulation and a second ink formulation from a dispensing system,
   wherein the dispensing system comprises the first pigment-based ink formulation at an acidic pH and the second ink formulation at a basic pH, wherein the first pigment-based ink formulation comprises a first pigment based ink and an amphoteric dispersant, wherein the amphoteric dispersant has an isoelectric point, and wherein the amphoteric dispersant is formed by the reaction of a succinic anhydride with polyethyleneimine, wherein the acidic pH is from about 3 to 6.5 and the basic pH is from about 7.5 to 10, wherein the amphoteric dispersant has an isoelectric point higher than the acidic pH and the isoelectric point is between the acidic pH and the basic pH; and wherein if the first pigment-based ink formulation and the second ink formulation are dispensed adjacent one another ink bleed between the first pigment-based ink formulation and the second ink formulation is substantially arrested.

10. An ink-jet ink set, comprising:
a first pigment-based ink formulation at an acidic pH, including:
 a pigment, and
 an amphoteric dispersant having an isoelectric point, wherein the amphoteric dispersant is formed by mixing arginine with polyethyleneimine; and
a second ink formulation at a basic pH,
wherein the amphoteric dispersant has an isoelectric point higher than the acidic pH, and the isoelectric point is between the acidic pH and the basic pH,
wherein when the first pigment-based ink formulation and the second ink formulation are disposed adjacent one another, the dispersed pigment falls out of solution, resulting in reduced bleed between the first pigment-based ink formulation and the second ink formulation.

* * * * *

UNITED STATES PATENT AND TRADEMARK OFFICE
CERTIFICATE OF CORRECTION

PATENT NO. : 7,666,256 B2  
APPLICATION NO. : 10/975705  
DATED : February 23, 2010  
INVENTOR(S) : Palitha Wickramanayake Page 1 of 1

It is certified that error appears in the above-identified patent and that said Letters Patent is hereby corrected as shown below:

In column 8, line 60, in Claim 8, after "pH" insert -- is --.

In column 9, line 2, in Claim 9, delete "pigment based" and insert -- pigment-based --, therefor.

Signed and Sealed this
Fourteenth Day of June, 2011

David J. Kappos
*Director of the United States Patent and Trademark Office*